United States Patent
Cox

(10) Patent No.: US 12,057,788 B2
(45) Date of Patent: Aug. 6, 2024

(54) MAGNETICALLY LEVITATED GRAPHENE-ENHANCED INSOLE TRIBOELECTRIC NANOGENERATOR

(71) Applicant: Jacob Cox, Lexington, VA (US)

(72) Inventor: Jacob Cox, Lexington, VA (US)

(73) Assignee: Jacob Cox, Lexington, VA (US)

( * ) Notice: Subject to any disclaimer, the term of this patent is extended or adjusted under 35 U.S.C. 154(b) by 164 days.

(21) Appl. No.: 17/196,668

(22) Filed: Mar. 9, 2021

(65) Prior Publication Data

US 2022/0123670 A1    Apr. 21, 2022

Related U.S. Application Data

(60) Provisional application No. 63/093,175, filed on Oct. 17, 2020.

(51) Int. Cl.
*H02N 15/00* (2006.01)
*H02N 1/04* (2006.01)
*A43B 3/38* (2022.01)

(52) U.S. Cl.
CPC ............... *H02N 15/00* (2013.01); *H02N 1/04* (2013.01); *A43B 3/38* (2022.01)

(58) Field of Classification Search
CPC ............. H02N 1/04; H02N 15/00; A43B 3/38
See application file for complete search history.

(56) References Cited

U.S. PATENT DOCUMENTS

| | | | |
|---|---|---|---|
| 2011/0148248 A1* | 6/2011 | Landa | H01J 45/00 310/306 |
| 2019/0028040 A1* | 1/2019 | Song | H02N 1/04 |
| 2020/0161990 A1* | 5/2020 | Lin | H02N 1/04 |
| 2022/0007515 A1* | 1/2022 | Ionescu | C01B 32/198 |

* cited by examiner

*Primary Examiner* — Mohamad A Musleh

(57) ABSTRACT

Described herein is a graphene-enhanced triboelectric nanogenerator with magnetically levitated suspension in the form of a shoe insole insert producing energy from the rise and fall of a human heel when walking in shoes for the mobile charging of small to medium-sized electronic devices.

1 Claim, 6 Drawing Sheets

MAGNETICALLY LEVITATED GRAPHENE-ENHANCED INSOLE TRIBOELECTRIC NANOGENERATOR

BACKGROUND (1) Field of the Invention (2) Description of Related Art Including Information Disclosed Under 37 CFR 1.97 and 1.98

The present invention relates to small triboelectric generators

BRIEF SUMMARY OF INVENTION

Most shoe based triboelectric nanogenerators meant to charge devices use flex bowing material or foam to allow for contact and release for the production of energy through triboelectric effect, in addition to using metals, which oxidize readily when exposed to sweat, for conduction of the electricity produced. In the embodiment of the invention we show the use of magnetic strips and thin rare-earth metal magnet discs for contact and release for energy production and graphene for conducting the energy to storage for subsequent use for a better, more conductive, and longer lasting insole triboelectric nanogenerator. The force produced by a person is three times their resting weight this requires a nanogenerator that doesn't wear out easily instead of foam or flexible bowing material the embodiment of this invention gives a minimal wear by using magnetic repulsion, in addition without the oxidation of the conductive material by using Graphene which is far more conductive than metal and less susceptible to oxidation.

DETAILED DESCRIPTION OF INVENTION

Figure 1:
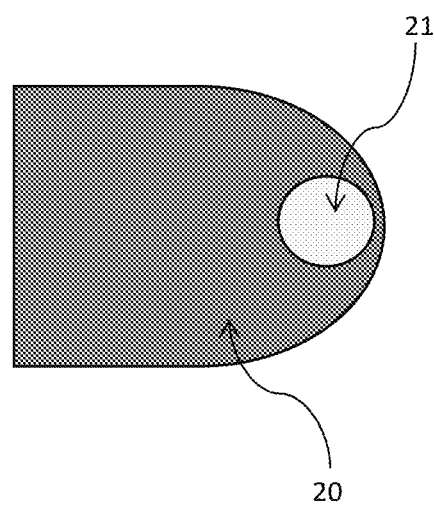
FIG. 1 Depicts the top flexible pad

In regards to FIG. 1, 21 of FIG. 1 shows the rare-earth metal magnet adhered to 20 of FIG. 1 the top flexible magnetic pad.

Figure 1A:
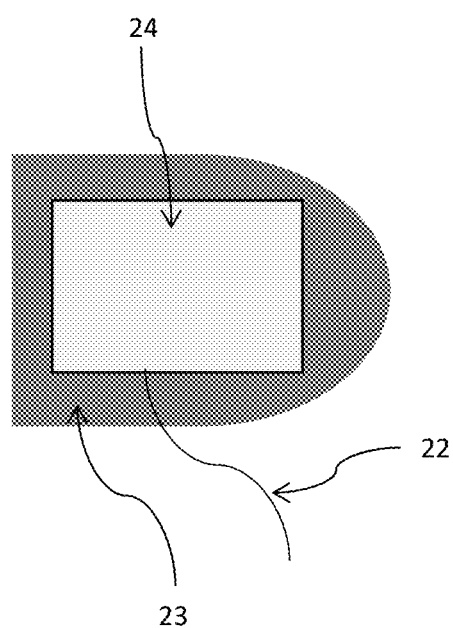
FIG. 1A is showing the inner side of the top pad.

In respect to FIG. 1A, 24 of FIG. 1A depicts the positive graphene-enhanced triboelectric pad that is adhered to 23 of FIG. 1A and connected to 22 of FIG. 1A, the wire. 22 FIG. 1A closes the circuit to allow flow of current from 24 of FIG. 1A.

Figure 2:
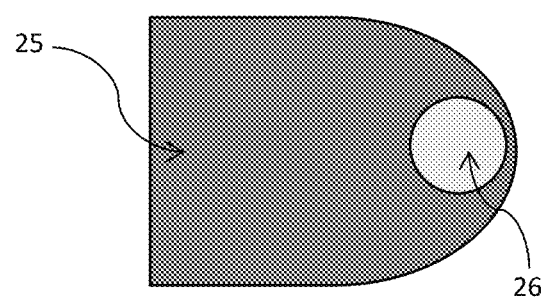
FIG. 2 is showing the outside of the bottom pad

Regarding FIG. 2, 25 of FIG. 2 depicts the bottom flexible magnetic pad. 26 of FIG. 2 depicts the rare-earth metal magnet adhered to 25 of FIG. 2.

Figure 2A:
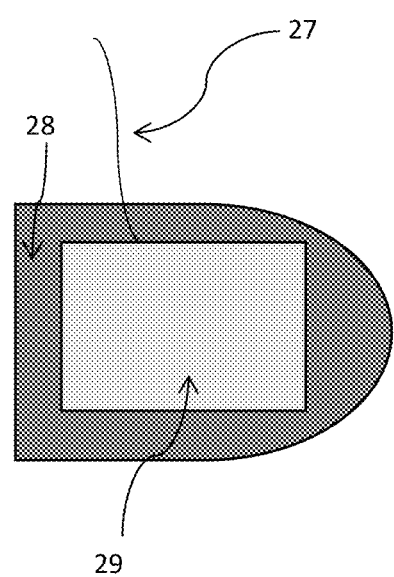
FIG. 2A is showing the inner side of the bottom pad
FIG. 3 Depicts the side view insole generator
FIG. 3A Depicts the side view of the generator in a compressed state

In respect to FIG. 2A, 28 of FIG. 2A shows the inside of the bottom half of the apparatus, which has adhered to it, 29 of FIG. 2A the negative graphene-enhanced triboelectric pad. 27 of FIG. 2A represents the wire connected to 29 of FIG. 2A. 29 of FIG. 2A becomes negatively charged after contact with 24 of FIG. 1A energy flows through the wire connected to the negative graphene-enhanced triboelectric pad.

Figure 3:
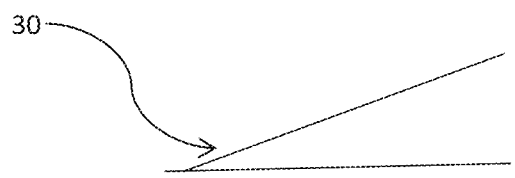

In regard to FIG. 3, 30 of FIG. 3 shows the assembled apparatus where the top flexible magnetic pad, is adhered to the inner side of the bottom flexible magnetic pad, acting as the anchor while in the shoe for magnetic repulsion by rare-earth metal magnet, and the top flexible magnetic pad is being magnetically levitated over the bottom flexible magnetic pad via homopolar repulsion.

Figure 3A:
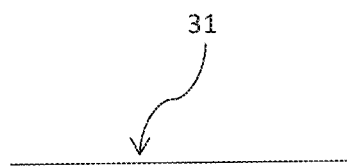

31 of FIG. 3A represents the compression of the apparatus causing contact between the positive graphene-enhanced triboelectric pad and the negative graphene-enhanced triboelectric pad creating charge.

REFERENCES

Pat app serial no. US2014/0084784 A1. By extrapolating triboelectric material surface area to a larger scale, as shown in Gomes et al, arVix:1803.10070 [comd-mat.meshall] (2018),
Sharma, K. R. Graphene materials. N.Y. 2014. pp 9
U.S. Pat. No. 5,825,105

I claim:
1. A first flexible magnetic pad having adhered on the top side a first rare-earth metal magnet, and having adhered on the inner side of the first flexible magnetic pad a first graphene-enhanced triboelectric pad and a first wire; a second flexible magnetic pad having adhered on the bottom side a second rare-earth metal magnet, and having adhered on the inner side of the second flexible magnetic pad a second graphene-enhanced triboelectric pad and a second wire, wherein the first and the second rare-earth metal magnets are positioned for homopolar repulsion to allow repulsion and compression of the first and second flexible magnetic pads, the first flexible magnetic pad is anchored by the second flexible magnetic pad by adhesion with the inner side of the first flexible magnetic pad facing the inner side of the second flexible magnetic pad, wherein the repulsion and the compression of the first and the second flexible magnetic pads causes the first and the second graphene-enhanced triboelectric pads to contact, wherein the contact of the first and the second graphene-enhanced triboelectric pads create charge, the charge created is conducted through the first and the second wires to a load.

* * * * *